(12) United States Patent
Stephens-Doll

(10) Patent No.: US 7,454,616 B2
(45) Date of Patent: Nov. 18, 2008

(54) CODE AUTHENTICATION UPON BOOTUP FOR CABLE MODEMS

(75) Inventor: Robert M. Stephens-Doll, Jamul, CA (US)

(73) Assignee: General Instrument Corporation, Horsham, PA (US)

(*) Notice: Subject to any disclaimer, the term of this patent is extended or adjusted under 35 U.S.C. 154(b) by 890 days.

(21) Appl. No.: 11/030,859

(22) Filed: Jan. 7, 2005

(65) Prior Publication Data

US 2006/0156007 A1    Jul. 13, 2006

(51) Int. Cl.
*G06F 9/00* (2006.01)
(52) U.S. Cl. .................. 713/168; 713/166; 713/182
(58) Field of Classification Search .......... 713/168, 713/182
See application file for complete search history.

(56) References Cited

U.S. PATENT DOCUMENTS

| 5,491,750 | A | * | 2/1996 | Bellare et al. | ............... 713/155 |
| 5,752,041 | A | * | 5/1998 | Fosdick | ................. 717/178 |
| 5,815,574 | A | * | 9/1998 | Fortinsky | ............... 713/153 |

* cited by examiner

*Primary Examiner*—Thomas R Peeso
(74) *Attorney, Agent, or Firm*—Benjamin D. Driscoll

(57) ABSTRACT

An exemplary embodiment of a method (10) for authenticating software in a cable modem makes use of a secure key and certificate stored in flash memory. In this exemplary embodiment, the code employs a key to validate (16) a signature that is generated for each new build of the code. During build of the code, the code is digitally signed (12) using e.g., a Motorola RSA private key. The message digest and the signature are then stored at the end of code file itself (13). Each time the modem (52) reboots, the code can validate (16) that the image in flash has not been modified. This validation function (16) can be accomplished e.g., by calling an RSA Signature Verification function to confirm that the signature in the header equals the message digest signed by the manufacturer's private key or the manufacturer's CVC.

20 Claims, 6 Drawing Sheets

60

CODE AUTHENTICATION UPON BOOTUP FOR CABLE MODEMS

FIELD OF THE INVENTION

The present invention relates generally to methods and apparatuses for authenticating data, and more particularly to a method and apparatus for authenticating data in the form of computer software embedded in an electronic device.

BACKGROUND

Cable modems include embedded software the occasionally must be updated, sometimes even remotely. However, early cable modems, such as those compliant with DOCSIS 1.0, provided no mechanism to authenticate the code file during Unit Update.

In contrast, subsequent versions of cable modems, such as those compliant with DOCSIS 1.1, provide for a mechanism to authenticate the code file during Unit Update. This process is known as the DOCSIS BPI+ code authentication process or commonly as Secure Software Download. While this process guarantees authentication during a download, this process does not provide authentication of an image when the image reboots in the device. Consequently, if an image gets modified by a hacker, and placed into the modem directly, currently there is no way to detect such an occurrence.

The present invention is therefore directed to the problem of developing a method and apparatus for authenticating an image of software in an electronic device, such as a cable modem.

SUMMARY OF THE INVENTION

The present invention solves these and other problems by providing a method for authenticating software in a cable modem that operates upon startup and that enables the code itself to determine if the code has been modified.

According to one aspect of the present invention, an exemplary embodiment of a method for authenticating software in a cable modem makes use of a secure key and certificate stored in flash memory. In this exemplary embodiment, the code employs a key to validate a signature that is generated for each new build of the code. During build of the code, the code is digitally signed using a private key, creating a RSA SHA-1 based signature over the image. The message digest and the signature are then inserted at the end of the code file itself. Each time the modem reboots, the code can validate that the image in flash has not been modified. This validation function can be accomplished e.g., by calling an RSA Signature Verification function to confirm that the signature in the header equals the message digest signed by the private key.

Other aspects of the present invention will be apparent upon review of the following drawings and the detailed description.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Currently, during image download, the code in a cable modem employs a simple MD5 digest in the unit update file to provide a test against file corruption and/or modification. However, a hacker can recreate the MD5 digest if the hacker modifies the firmware. The various embodiments of the present invention enable the code itself to determine if it has been modified.

Motorola modems since the first SB3100 include a secure key (public key) and certificates stored in the flash. One embodiment of the present invention will use a public key to validate a signature that is generated for each new build using a private signing key. The firmware is built normally. The firmware is then digitally signed using the cable modem's manufacturer's private signing key. Signing the firmware creates a RSA SHA-1 based signature over the image. According to one embodiment (DOCSIS 1.0) of the present invention, the signature is stored at the end of the code file itself. Each time the modem reboots, the modem itself can validate that the image in flash has not been modified. This can be accomplished by calling an RSA Signature Verification function to confirm that the signature equals the message digest signed by the manufacturer's private key.

Code Authentication upon Bootup for DOCSIS 1.0 Cable Modems

Overall Design

During image download, an MD5 digest in the unit update file provides a test against file corruption and/or modification. However, this MD5 digest can be recreated by a hacker if they have modified the firmware. The embodiments herein enable the code itself to determine if it has been modified.

Figure 1:
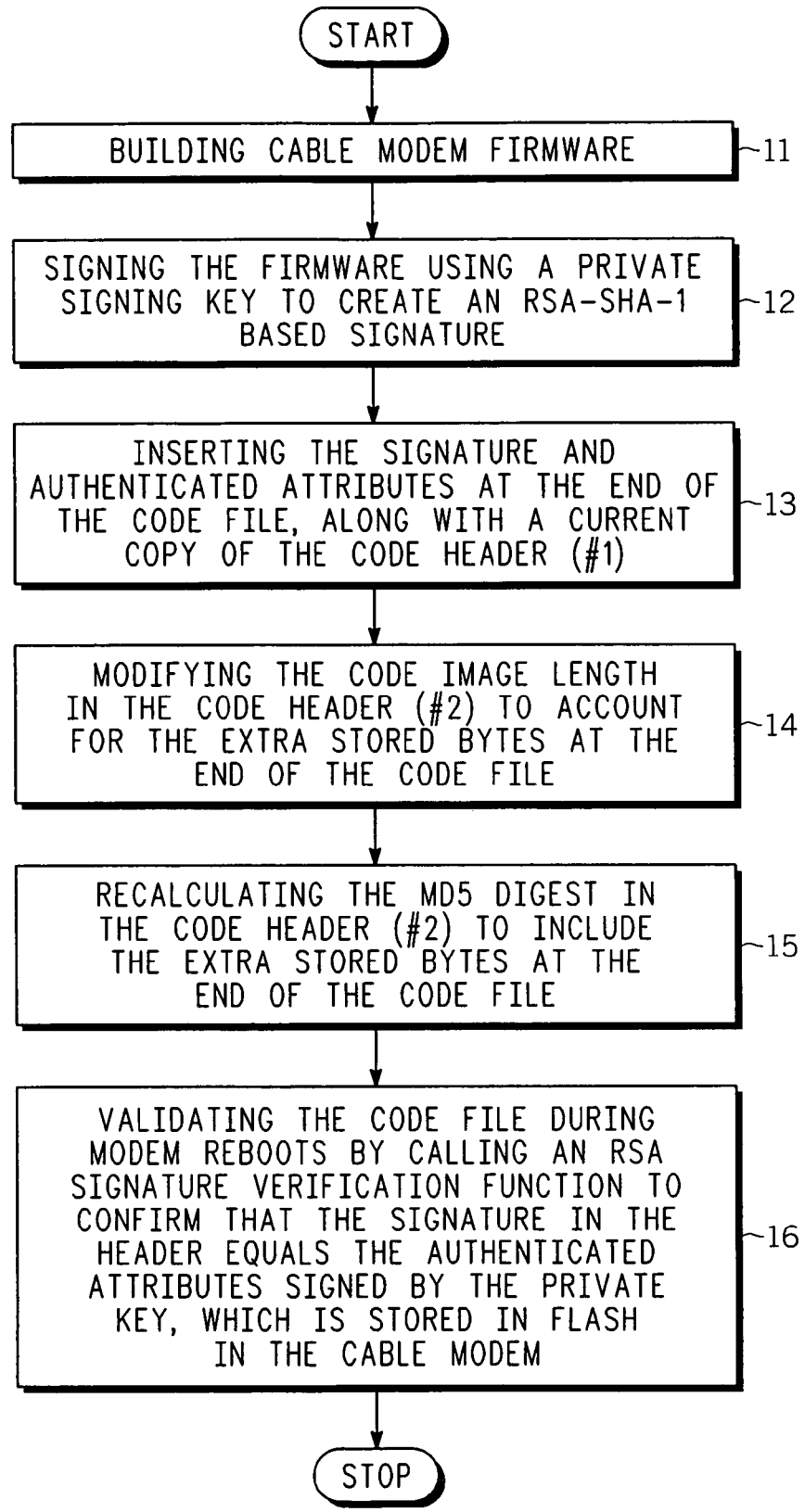
FIG. 1 depicts an exemplary embodiment of a method for authenticating code in a cable modem according to one aspect of the present invention.

Motorola modems since the first SB3100 have a secure public key and certificates in the flash. The embodiments here of a self-authenticating code process use a public key to validate a signature that is generated with a private key for each new build of the code. Turning to FIG. 1, shown therein is an exemplary embodiment 10 of a method for creating self-authenticating code in a cable modem or the like.

In element 11, the firmware is built in the normal manner.

In element 12, the firmware is then digitally signed using a private signing key. The end result of this step is the creation of a RSA SHA-1 based signature.

In element 13, the signature and authenticated attributes are subsequently added to the end of the Code File, along with a current copy of the Code Header (#1).

In element 14, the code image length is then modified in the Code Header (#2) to account for the extra stored bytes at the end of the Code File.

In element 15, the MD5 Digest in the Code Header (#2) is also recalculated to include the extra stored bytes at the end of the Code File. These two actions in elements 14 and 15 are necessary to allow Unit Update to load the modified Code File.

In element 16, subsequently, each time the modem reboots, the modem itself can then validate that the image in flash has not been modified. This can be accomplished by calling an RSA Signature Verification function to confirm that the signature in the header equals the authenticated attributes signed by the private key. The public key required for verification is stored in flash in the cable modem. A more complete self-authentication process is shown in FIG. 2.

Self-Authentication Process when the Code Boots

Figure 2:
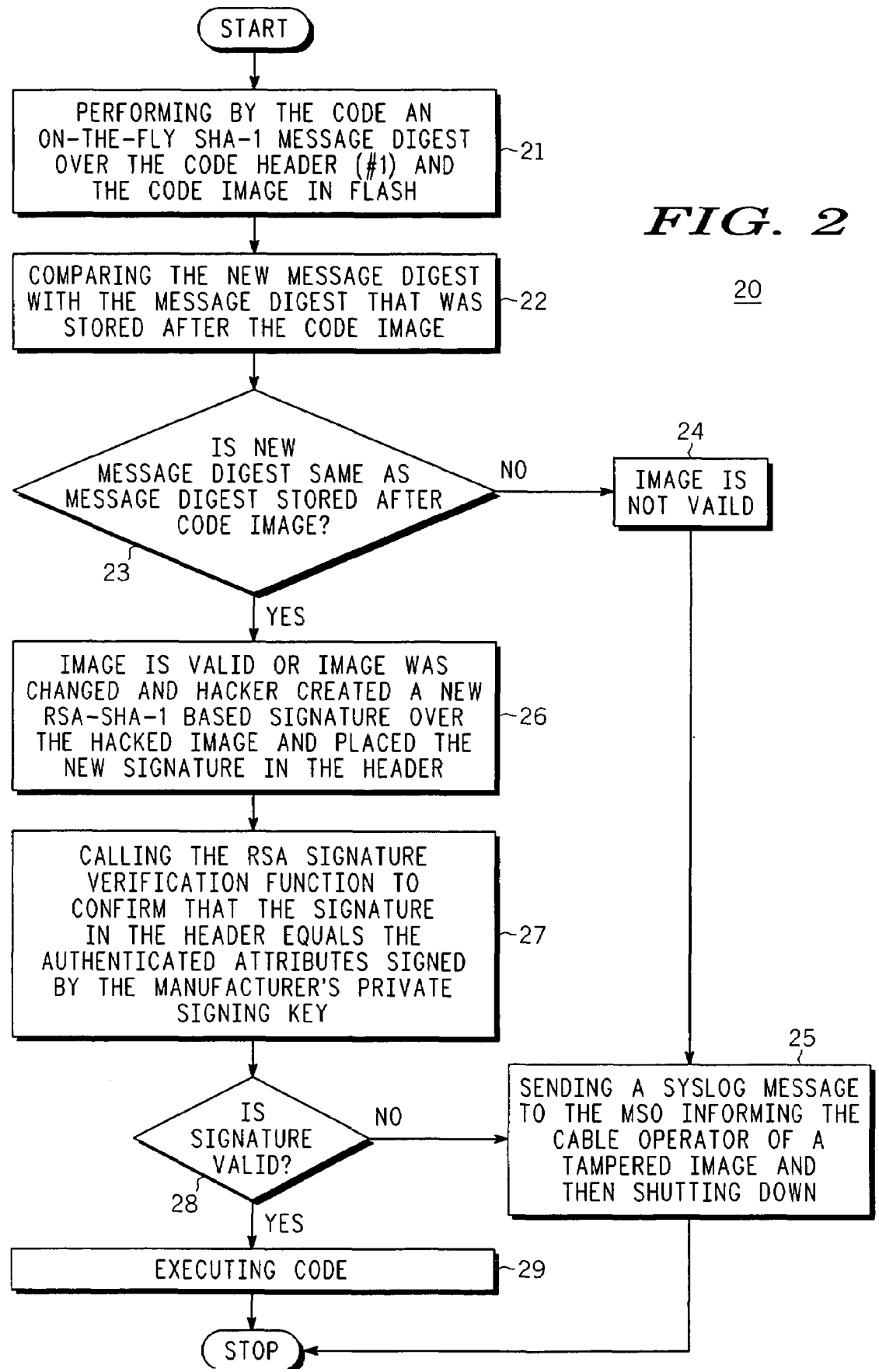
FIG. 2 depicts another exemplary embodiment of a method for authenticating code in a cable modem according to yet another aspect of the present invention.

Turning to FIG. 2, shown therein is an exemplary embodiment of a method 20 for self-authenticating code in a DOCSIS 1.0 cable modem or the like. In element 21, the code does an on-the-fly SHA-1 message digest over the Code Header (#1) and the Code Image in flash.

In element 22, the code compares this new message digest with the message digest that was stored after the code image.

In element 23, if the new message digest is not the same as the message digest that was stored after the code image, the process moves to element 24, in which the image is declared "invalid" (in element 24). The process then moves to element 25, in which the code sends a syslog message to the cable operator informing the cable operator of a tampered image and shuts itself down.

In element 23, if the new message digest is the same as the message digest that was stored after the code image, then in element 26 it is determined that either the image is either valid—or—the image was changed, in the latter case of which the hacker also must have created a new RSA SHA-1 based signature over the hacked image and placed the new signature into the header. Because there is no way to determine this easily, further checks are required.

In element 27, the code then calls the RSA Signature Verification function to confirm that the signature equals the Authenticated Attributes signed by the manufacturer's private signing key In element 28, if the signature is valid the process moves to element 29, in which the code executes normally.

In element 28, if the signature is not valid, the process moves to element 25, in which the code sends a syslog message to the Cable Operator informing the Cable Operator of a tampered image and then the modem shuts down.

Field Upgrade Process

Figure 3:
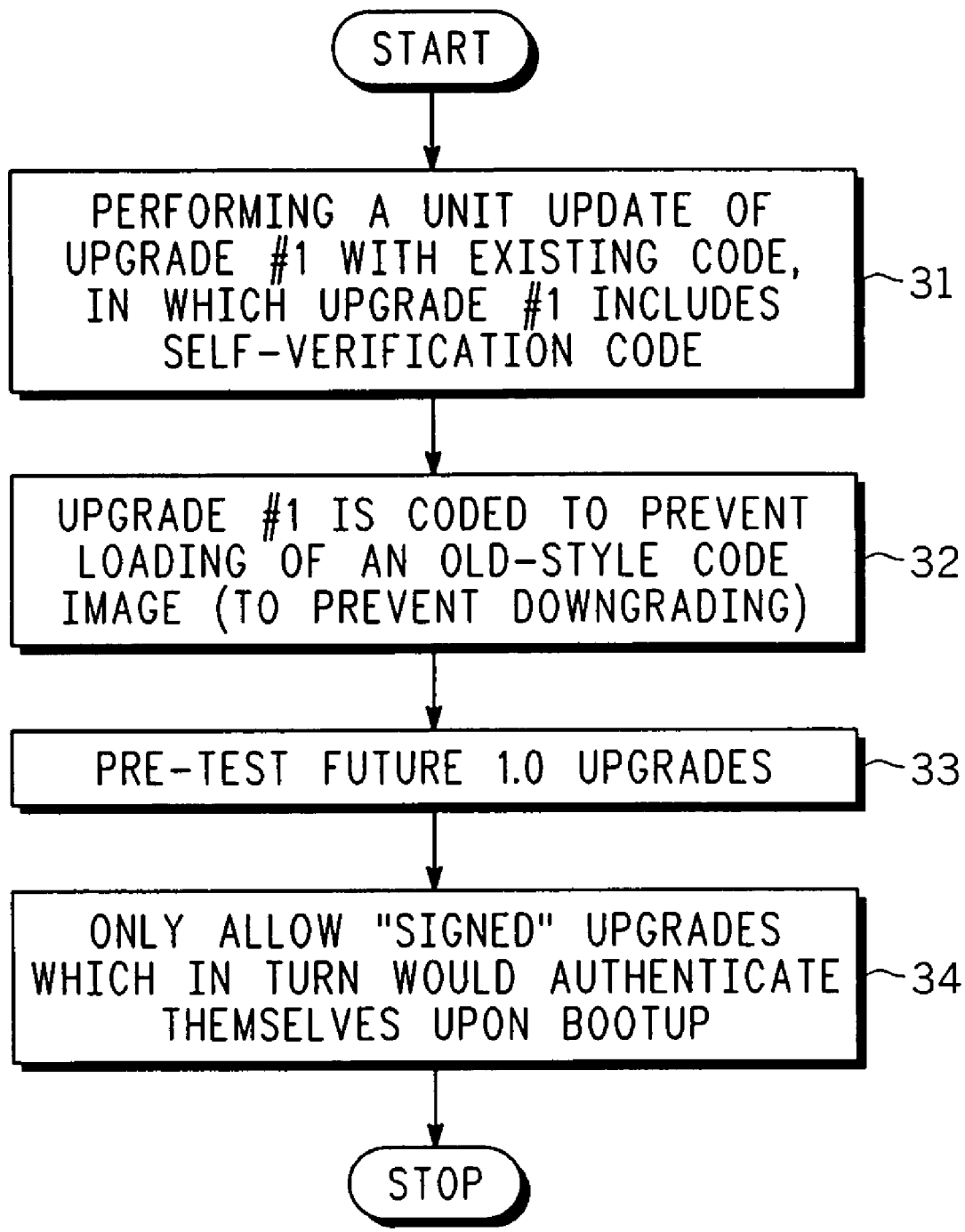
FIG. 3 depicts an exemplary embodiment of a method for updating code in a cable modem according to still another aspect of the present invention.

An exemplary embodiment of a field upgrade process operates as shown in FIG. 3. The field upgrade process takes one upgrade to get the functionality into the modem.

In element 31, the current code does not know anything about any new functionality and just does Unit Update of Upgrade#1 in the normal manner. Upgrade#1 includes self-verification code.

In element 32, Upgrade #1 is also coded to prevent loading of an old-style Code Image (to prevent downgrading). This design would allow 1.0 cable modem code to be self-authenticating, and prevent some of the current hacking scenarios.

According to an alternative implementation, one could also pre-test future 1.0 upgrades (element 33) and only allow "signed" upgrades which in turn would authenticate themselves upon bootup (element 34).

Vulnerability

If a hacker was able to discover the locations of all the Certificates and Keys in the modem, and successfully hacked the code and replaced the Certificates and Keys (in effect, changing the entire Chain of Authority) and changed the Code Image signatures to match the new keys, the above features would be circumvented. One could not fall back on the fact that BPI+ would not work with the new Chain of Authority since DOCSIS 1.0 does not do BPI+ or need the certificates.

An additional and more secure design would place this functionality into the Bootloader, which would provide authentication (or lack thereof) of older images that were flashed by a hacker into a modem, i.e., the bootloader would refuse to load an unsigned code image.

Code Authentication upon Bootup for DOCSIS 1.1 Cable Modems

Self-Authentication Process when the Code Boots

Figure 6:
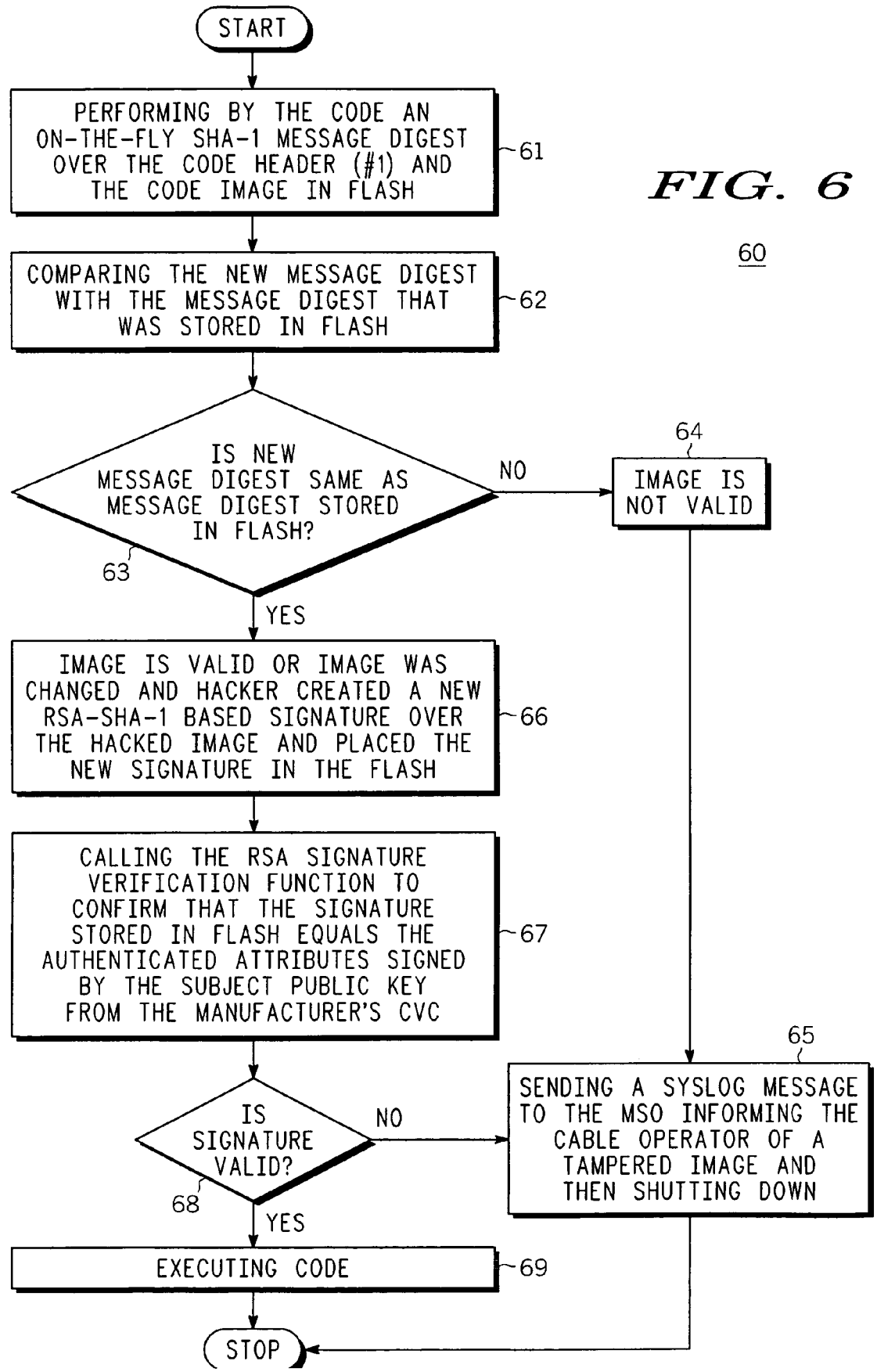
FIG. 6 depicts another exemplary embodiment of a method for authenticating code in a cable modem according to yet another aspect of the present invention.

Turning to FIG. 6, shown therein is an exemplary embodiment of a method 60 for self-authenticating code in a DOCSIS 1.1 cable modem or the like. In element 61, the code does an on-the-fly SHA-1 message digest over the Code Header (#1) and the Code Image in flash.

In element 62, the code compares this new message digest with the message digest that was stored in flash.

In element 63, if the new message digest is not the same as the message digest that was stored in flash, the process moves to element 64, in which the image is declared "invalid" (in element 64). The process then moves to element 65, in which the code sends a syslog message to the cable operator informing the cable operator of a tampered image and shuts itself down.

In element 63, if the new message digest is the same as the message digest that was stored in flash, then in element 66 it is determined that either the image is either valid—or—the image was changed, in the latter case of which the hacker also must have created a new RSA SHA-1 based signature over the hacked image and placed the new signature into the flash. Because there is no way to determine this easily, further checks are required.

In element 67, the code then calls the RSA Signature Verification function to confirm that the signature equals the Authenticated Attributes signed by the Subject public key from the manufacturer's CVC.

In element 68, if the signature is valid the process moves to element 69, in which the code executes normally.

In element 68, if the signature is not valid, the process moves to element 65, in which the code sends a syslog message to the Cable Operator informing the Cable Operator of a tampered image and then the modem shuts down.

Field Upgrade Process

Figure 4:
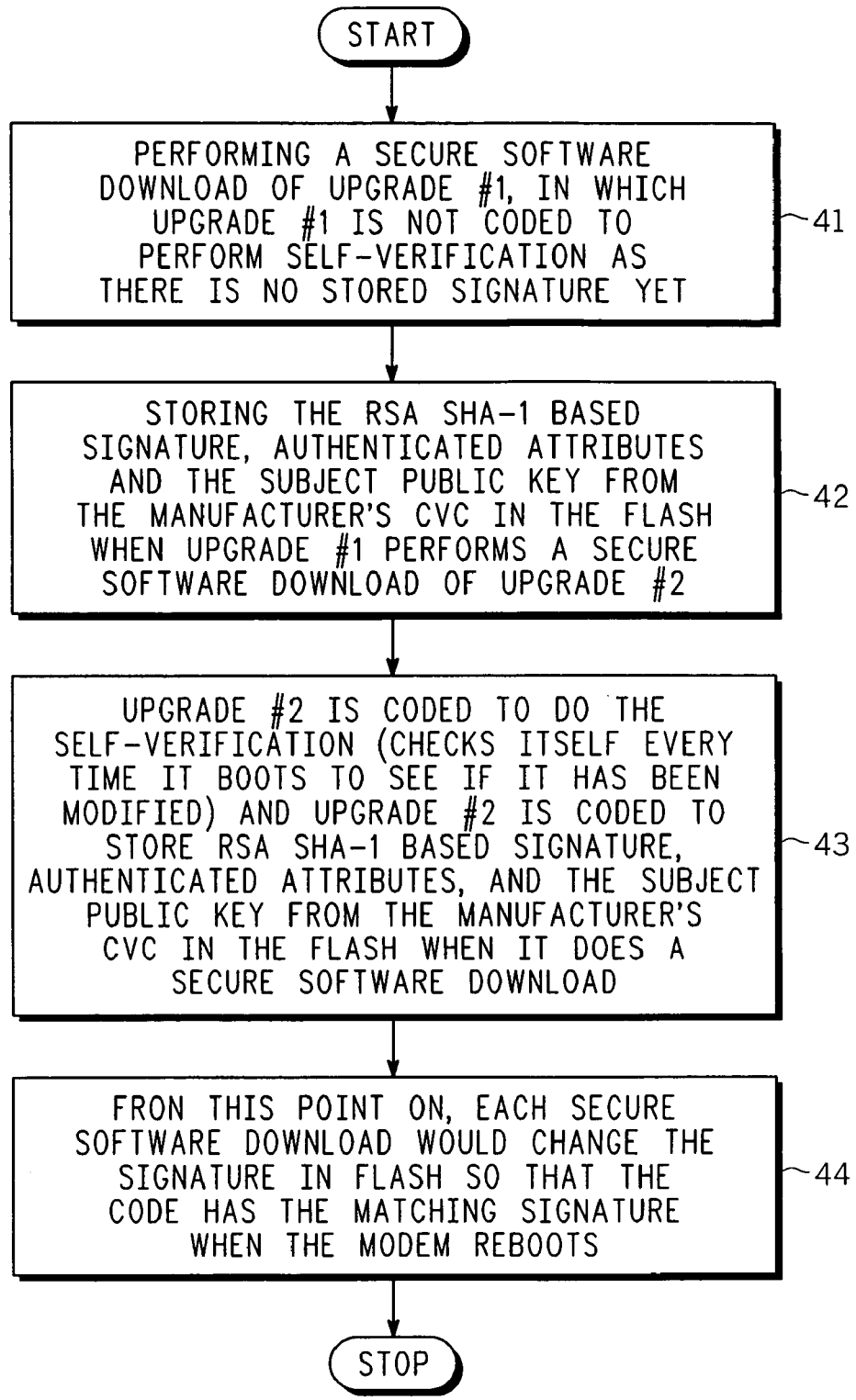
FIG. 4 depicts another exemplary embodiment of a method for updating code in a cable modem according to yet another aspect of the present invention.

An exemplary embodiment of a field upgrade process for a DOCSIS 1.1 cable modem operates as shown in FIG. 4. The signature must be stored in the flash, because the signature of an object cannot be stored within the object itself. The RSA SHA-1 based signature is over the whole image, including the header. Thus, the process 40 requires two upgrades to get the functionality into the modem.

In element 41, as the current code does not know anything about the new functionality, the current code performs a Secure Software Download of Upgrade#1. Upgrade#1 is not coded to do the self-verification, as there is no stored signature yet.

In element 42, Upgrade#1 is coded to store the RSA SHA-1 based signature, authenticated attributes, and Subject Public Key from the manufacturer's CVC in the flash when Upgrade #1 performs a Secure Software Download of Upgrade#2.

In element 43, Upgrade#2 is coded to do the self-verification (checks itself every time it boots to see if it has been modified) and Upgrade#2 is coded to store the RSA SHA-1 based signature, authenticated attributes, and Subject Public Key from the manufacturer's CVC into the flash when it does a Secure Software Download.

In element 44, from this point on, each Secure Software Download would change the signature in flash so that the code has the matching signature when the modem reboots. This embodiment enables cable modem code to be self-authenticating, and prevents hacking and cloning of cable modems.

The embodiments of the present invention are applicable to, among other things, SURFboard Cable Modems, MTAs, DCT set top boxes with integrated cable modems, and other devices which use in-the-field code download, and which possess at least one Certificate signed by a Root Authority.

Figure 5:
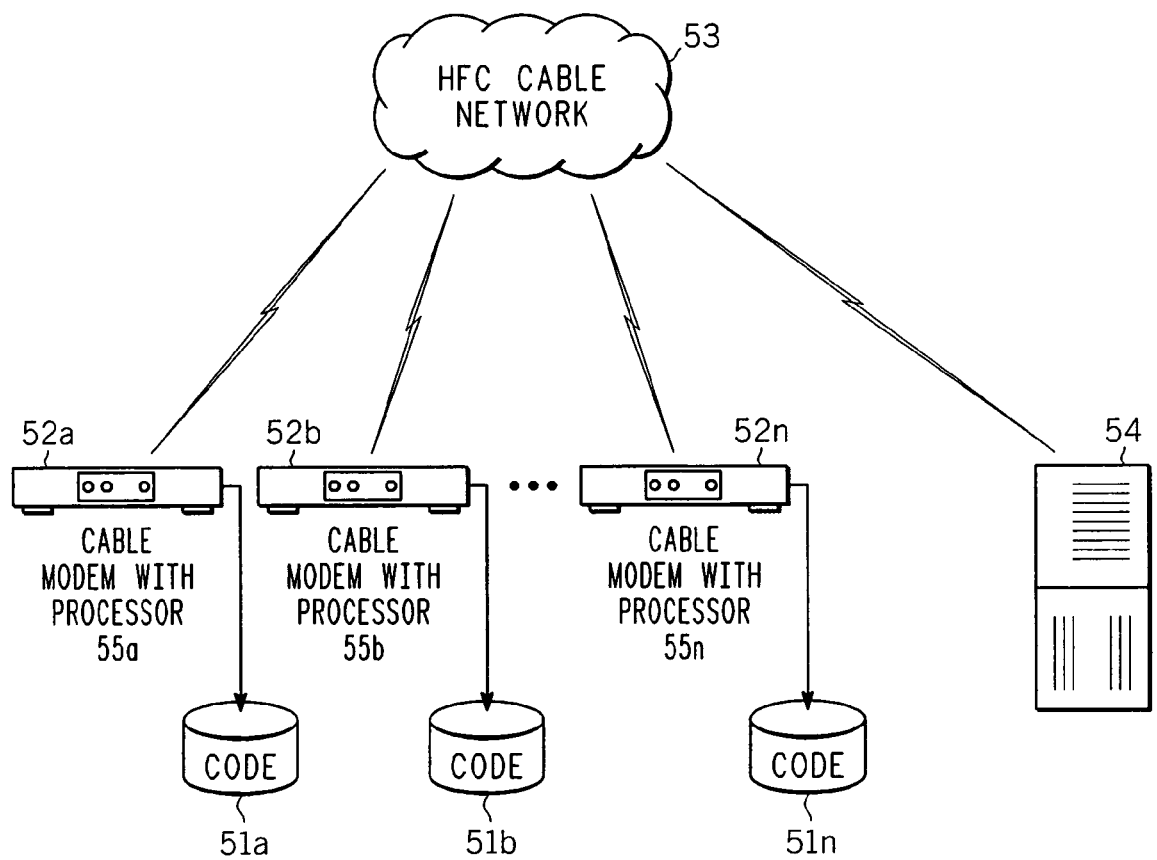
FIG. 5 depicts an exemplary embodiment of an apparatus for updating the code in a cable modem coupled to a cable network.

Turning to FIG. 5, shown therein is an exemplary embodiment of an apparatus 50 for updating the code 51*a-n* in cable modems 52*a-n* coupled to a cable network 53. A code update server 54 includes the various versions of the code that are downloaded to the modems 52*a-n* via network 53.

Although various embodiments are specifically illustrated and described herein, it will be appreciated that modifications and variations of the invention are covered by the above teachings and are within the purview of the appended claims without departing from the spirit and intended scope of the invention. For example, certain public keys and certificates are discussed above, however, any public key and certificate may be employed. Furthermore, these examples should not be interpreted to limit the modifications and variations of the invention covered by the claims but are merely illustrative of possible variations.

What is claimed is:

1. A method (10) for operating a cable modem comprising:
    inserting (13) a RSA-SHA-1 based signature and related authenticated attributes at an end of the code file; and
    validating (16) the code file during each reboot operation of the cable modem to confirm that the signature in a header equals the authenticated attributes signed by a private key that created the RSA-SHA-1 based signature.

2. The method (10) according to claim 1, further comprising:
    signing (12) the code file using a private key to create an RSA-SHA-1 based signature.

3. The method (10) according to claim 1, further comprising:
    modifying (14) an image code length in a code header to account for any extra bytes at the end of the code file.

4. The method (10) according to claim 3, further comprising:
    recalculating (15) a message digest in the code header to account for the extra bytes stored at the end of the code file.

5. The method (10) according to claim 1, wherein said validating (16) is accomplished by calling an RSA Signature Verification function to confirm that the signature in the header equals the authenticated attributes signed by the private key.

6. A method (40) for authenticating software in a cable modem comprising:
    storing (42) an RSA SHA-1 based signature, one or more authenticated attributes, and a Subject Public Key from the manufacturer's CVC in flash memory during download of new code to the cable modem; and
    during a reboot process, validating (43) that the image in flash has not been modified.

7. A method (10) for authenticating code in an electronic device comprising:
    generating (11) the code;
    signing (12) the code using a signing key;
    validating (16) the code during a reboot process of the electronic device by verifying that a signature in a header equals signed authenticated attributes.

8. The method (10) according to claim 7, further comprising:
    inserting (13) the signature and authenticated attributes at an end of the signed code along with a current copy of said header.

9. The method (10) according to claim 8, further comprising:
    modifying (14) a code length in a new header to account for extra bytes stored at the end of the code; and
    recalculating (15) a message digest to account for the modified code length.

10. An apparatus (52) including self-authenticating code comprising:
    a memory (51) storing the code; and
    a processor (55*a*) coupled to the memory (51) and inserting an RSA-SHA-1 based signature and related authenticated attributes at an end of the code file, and validating the code file during each reboot operation of the cable modem to confirm that the signature in a header equals the authenticated attributes signed by a private key that created the RSA-SHA-1 based signature.

11. The apparatus (52) according to claim 10, wherein said code is digitally signed using a private key to create an RSA-SHA-1 based signature.

12. The apparatus (52) according to claim 10, wherein said processor (55*a*) modifies an image code length in a code header to account for any extra bytes at the end of the code file.

13. The apparatus (52) according to claim 12, wherein said processor (55*a*) recalculates a message digest in the code header to account for the extra bytes stored at the end of the code file.

14. The apparatus (52) according to claim 10, wherein said processor validates the code by calling an RSA Signature Verification function to confirm that the signature in the header equals the authenticated attributes signed by the private key.

15. An apparatus (50) for communicating new code to a plurality of electronic devices (52*a-n*) via a network (53) comprising:
    a server (54) stored a current version of code to be downloaded to the plurality of electronic devices (52*a-n*);
    a memory (51*a-n*) disposed in each of the plurality of electronic devices (52*a-n*) to store code having an RSA-SHA-1 based signature and related authenticated attributes stored at an end of the code file; and
    a processor (55*a-n*) disposed in each of the plurality of electronic devices (52*a-n*) communicating with the server (54), said processor (55*a-n*) being coupled to the memory (51*a-n*) and validating the code file during each reboot operation to confirm that the signature in a header equals the authenticated attributes signed by a private key that created the RSA-SHA-1 based signature.

16. The apparatus (50) according to claim 15, wherein said code is digitally signed using a private key to create an RSA-SHA-1 based signature.

17. The apparatus (50) according to claim 15, wherein said processor (55*a*) modifies an image code length in a code header to account for any extra bytes at the end of the code file.

18. The apparatus (50) according to claim 17, wherein said processor (55*a*) recalculates a message digest in the code header to account for the extra bytes stored at the end of the code file.

19. The apparatus (50) according to claim 15, wherein said processor (55*a*) validates the code by calling an RSA Signature Verification function to confirm that the signature in the header equals the authenticated attributes signed by the private key.

20. A method (20) for authenticating code in a device comprising:
- calculating (21) an on-the-fly SHA-1 message digest over a stored Code Header and the Code Image;
- comparing (22) a new message digest with a message digest that was stored;
- if the new message digest is not the same as the stored message digest, declaring (24) the image to be invalid and sending (25) a syslog message to a system operator informing the system operator of a tampered image and shutting down the device; and
- if the new message digest is the same as the stored message digest, then:
  - calling (27) an RSA Signature Verification function to confirm that a signature equals signed Authenticated Attributes;
  - if the signature is valid, executing (29) the code normally; and
  - if the signature is not valid, sending (25) sends a syslog message to the system operator informing the system operator of a tampered image and shutting the device down.

* * * * *

UNITED STATES PATENT AND TRADEMARK OFFICE
CERTIFICATE OF CORRECTION

PATENT NO. : 7,454,616 B2  
APPLICATION NO. : 11/030859  
DATED : November 18, 2008  
INVENTOR(S) : Stephens-Doll Page 1 of 1

It is certified that error appears in the above-identified patent and that said Letters Patent is hereby corrected as shown below:

In Fig. 4, Sheet 4 of 6, for Tag "44", Line 1, please delete "FRON" and replace with --FROM--

COLUMN 3:  
Line 41: After "key", please insert --.--

Signed and Sealed this

Twenty-fifth Day of August, 2009

David J. Kappos  
*Director of the United States Patent and Trademark Office*